Jan. 14, 1964  W. A. SCHOEFFLER  3,117,805
TRAILER HITCH
Filed Jan. 23, 1962
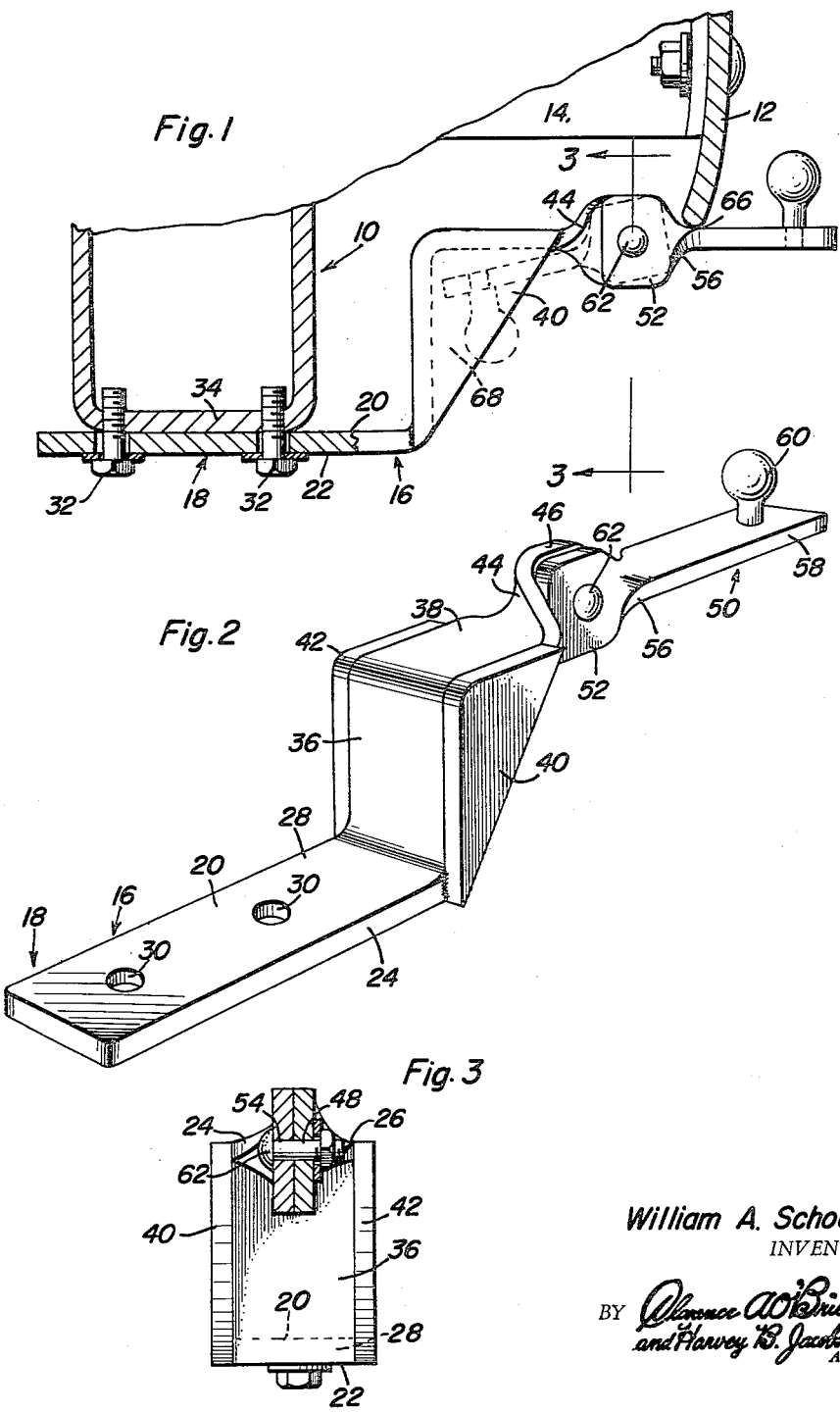
William A. Schoeffler
INVENTOR.

3,117,805
TRAILER HITCH
William A. Schoeffler, 4011 California Ave., Carmichael, Calif., assignor of fifty percent to Marie Schoeffler, Carmichael, Calif.
Filed Jan. 23, 1962, Ser. No. 168,095
7 Claims. (Cl. 280—491)

This invention relates to a novel and useful trailer hitch and more specifically to a trailer hitch which is adapted to be secured to the rear transverse frame member of a vehicle and to extend rearwardly thereof to a point with its rearmost end positioned behind the rear bumper of a vehicle and it is provided with a ball hitch member on its rear end. The rear end section of the trailer hitch is pivotally secured to the front end portion thereof for movement about an axis extending transversely of the trailer hitch whereby the rear end portion may be pivoted relative to the forward end portion and alongside a portion of the latter in order that the trailer hitch may be foreshortened.

The trailer hitch is specifically adapted for operation between extended and retracted positions in relation to the rear bumper of a vehicle in order that the ball hitch member thereof may be disposed rearmost in an exposed position when the trailer hitch is extended and may be substantially entirely hidden and disposed forwardly of the bumper when in the retracted position.

The main object of this invention is therefore to provide a trailer hitch having a ball hitch element thereon supported by a retractible portion of a trailer hitch whereby the ball hitch may be moved to a retracted out-of-the-way position not normally visible from the rear of the vehicle to which it is secured.

A further object of this invention, in accordance with the immediately preceding object, is to provide a vehicle trailer hitch constructed in a manner whereby it may be readily constructed to conform to various types of vehicles having different relative positionings of the rear transverse frame member and rear bumper.

A still further object of this invention is to provide a trailer hitch which may be constructed of readily available partially preformed component parts.

A still further object of this invention is to provide a trailer hitch which may be relatively easily constructed so as to be adapted to handle either light or heavy loads.

A final object of this invention to be specifically enumerated herein is to provide a trailer hitch which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary longitudinal vertical sectional view of the rear portion of a vehicle showing the trailer hitch of the instant invention operatively associated therewith, a part of the trailer hitch being broken away and shown in section and the retracted position of the ball hitch element thereof being shown in phantom lines;

FIGURE 2 is a perspective view of the trailer hitch; and

FIGURE 3 is a vertical transverse sectional view taken substantially upon a plane indicated by the section line 3—3 of FIGURE 1.

Referring now more specifically to the drawings the numeral 10 generally designates the rear transverse cross member of a vehicle frame from which a rear bumper 12 is supported by means of bumper arms 14.

The trailer hitch of the instant invention is generally designated by the reference numeral 16 and includes a generally horizontally disposed elongated mounting strap referred to in general by the reference numeral 18. The mounting strap 18 includes relatively wide opposite side faces 20 and 22 and narrow opposite edge faces 24 and 26 that extend longitudinally of the mounting strap. The mounting strap includes a forward end portion 28 that is provided with a plurality of bores 30 for the reception of fasteners 32 which are utilized to secure mounting strap 18 to the undersurface of the bottom 34 of the rear cross member 10.

The rear end of the forward end portion 28 terminates in an upwardly directed intermediate portion 36 which in turn terminates at its upper end in a rearwardly directed rear portion 38.

A pair of generally triangular brace plates 40 and 42 are secured to the corresponding edge faces 24 and 26 of the intermediate and rear portions 36 and 38.

The rear portion 38, a spaced distance from the forward end thereof, includes a twisted portion 44 that defines rearwardly thereof a first upstanding terminal end portion 46 that is rotated 180° relative to the forward end of the rear portion 38. The terminal end portion 46 is provided with a transverse bore 48.

An elongated hitch strap generally referred to by the reference numeral 50 is provided and includes a forward second upstanding terminal end portion 52 that is also provided with a transverse bore designated by the reference numeral 54. The hitch strap 50 includes a twisted portion 56 disposed to the rear of the terminal end portion 52 and the rear free end of the hitch strap is designated by the reference numeral 58 and is rotated 180° relative to the forward terminal end portion 52 thereof. It is to be noted that each of the twisted portions 44 and 56 are twisted in the same direction. A ball hitch element 60 is secured to the rear free end of the hitch strap 50 and it will be noted that the length of the hitch strap 50 between the bore 54 and the free end thereof is at least slightly less than the distance between the bore 48 and the intermediate portion 36. A pivot pin 62 is secured through the aligned bores 48 and 54 to pivotally secure the hitch strap 50 to the mounting strap 18. It will be noted that the terminal end portions 46 and 52 are disposed in side-by-side generally parallel relation and that when the hitch strap 50 is in the extended position the lower edge of the bumper 12 which is designated by the reference numeral 66 is disposed immediately above the hitch strap 50 a spaced distance to the rear of the twisted portion 56.

When the hitch strap 50 is pivoted to the retracted position as indicated in phantom lines in FIGURE 1 of the drawings, the free end thereof is received in the pocked 68 defined between the confronting surfaces of the intermediate and rear portions 36 and 38 between the brace plates 40 and 42. Accordingly, the ball hitch element 60 will be protected from the elements and from any spray that will be thrown up by the wheels of the vehicle of which the frame member 10 comprises a part.

If it is desired, the bores 48 and 54, while being registrable, need not be equally spaced from the upper and lower surfaces of the corresponding terminal end portions 46 and 52 in order that the hitch strap 50 may be very closely superimposed relative and disposed in surface-to-surace contacting relation with the rear portion 38 when in the retracted position. Inasmuch as the twisted portions 44 and 56 are each twisted in a counterclockwise direction when viewing the trailer hitch from the forward end thereof, the twisted portions 44 and 56 may also be disposed in surface to surface contacting relation. Another method for ensuring proper surface-to-surface contact between the folded straps, is to make bore 54 slightly closer to twisted portion 56 than the distance between bore 48 and twisted portion 44.

The forward end portion 28 may be of any desired length as may be the intermediate and rear portions 36 and 38. In this manner, the trailer hitch may be constructed to conform to the relative positioning of the rear cross member and bumpers of various types of vehicles. It will be noted that the intermediate portion 36 is of a height which enables the hitch strap 50 to be disposed immediately beneath the rear edge 66 of the bumper 12 when in the extended position.

It will be noted further that the trailer hitch may be readily constructed of flat stock with the exception of the pivot pin 62 and the ball hitch element 60. The flat stock of which the mounting strap 18 is formed may be bent in order to form the intermediate portion 36 and the offset rear portion 38 and the free end portion of the rear portion 38 may be twisted as at 44 to form the terminal end portion 46 which is rotated 90° about the longitudinal axis of the rear portion 38. Of course, the hitch strap 50 may be similarly formed and as it is readily apparent that the brace plates 40 and 42 are constructed of flat stock, the entire hitch may be constructed of flat stock after having been suitably shaped. Therefore, it may be seen that the trailer hitch 16 is a trailer hitch which will be capable of towing substantial loads behind a draft vehicle, which may be constructed of readily available materials at a low cost and which may have its normally exposed ball hitch element swung downwardly and forwardly to a substantially completely retracted position not normally visible from the rear of the vehicle of which the cross member 10 comprises a part.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle trailer hitch comprising a horizontally disposed elongated mounting strap having relatively wide opposite side faces and narrow opposite edge faces extending longitudinally of said strap, the front portion of said strap being adapted for securement to the rear cross member of a vehicle frame with the free rear end portion of said strap projecting rearwardly of said cross member and terminating adjacent the rear bumper of said vehicle, said strap including a rearwardly directed rear portion, the rear end portion of said rear portion being twisted about its longitudinal axis approximately 90° and defining a first upstanding terminal end portion disposed immediately rearwardly of the twisted portion of said strap, an elongated horizontally disposed hitch strap having relatively wide opposite side faces and narrow opposite edge faces extending longitudinally thereof and including front and rear ends, said hitch strap, rearwardly of its front end being twisted about its longitudinal axis approximately 90° and defining a second upstanding terminal end portion at its forward end, said first and second terminal end portions being disposed adjacent each other in side-by-side relation and having a pivot fastener secured therethrough securing said end portions together for relative rotation about an axis extending transversely and through the remote side faces thereof and spaced generally equally from said twisted portions of said straps but at least slightly closer to the twisted portion of said hitch strap, the free end of said hitch strap including means adapted for pivotal securement to a vehicle which is to be towed, said end portions of said straps, as seen therefrom, being twisted in opposite directions so that when said hitch strap has its free end pivoted back under said mounting strap and is in an inverted position, said end portions will then be twisted in the same direction and the twisted portion of one of said end portions will nestle snugly within the curves of the other twisted end portion.

2. The combination of claim 1 wherein said last mentioned means includes a ball hitch element which projects upwardly of the free end portion of said hitch strap when said free end of said hitch strap is substantially horizontally disposed and positioned to the rear of said mounting strap.

3. The combination of claim 2 wherein said mounting strap includes a pair of brace plates secured between corresponding edge portions of said intermediate portion and said rear portion forwardly of the twisted portion of said mounting strap defining a rearwardly and downwardly opening pocket in which said ball hitch element is receivable when retracted.

4. The combination of claim 1 wherein said last mentioned means includes a ball hitch element which projects upwardly of the free end portion of said hitch strap when said free end of said hitch strap is substantially horizontally disposed and positioned to the rear of said mounting strap, said hitch strap from its free end to said axis being at least slightly shorter than the distance between said axis and said intermediate portion.

5. In combination with a vehicle including a rear transverse frame member and a rear bumper whose lower edge is disposed rearwardly of and above the undersurface of said rear frame member, a horizontally disposed elongated mounting strap having relatively wide opposite side faces and narrow opposite edge faces extending longitudinally of said strap, the front portion of said strap being secured to said rear frame member and extending therebeneath with the free rear end portion of said strap projecting rearwardly of said cross member and terminating adjacent the rear bumper of said vehicle, said strap, rearwardly of its forward end, including an upwardly directed intermediate portion terminating at its upper end in a rearwardly directed rear portion, the rear end portion of said rear portion being twisted about its longitudinal axis approximately 90° and defining a first upstanding terminal end portion disposed immediately rearwardly of the twisted portion of said strap, an elongated horizontally disposed hitch strap having relatively wide opposite side faces and narrow opposite edge faces extending longitudinally thereof and including front and rear ends, said hitch strap, rearwardly of its front end being twisted about its longitudinal axis approximately 90° and defining a second upstanding terminal end portion at its forward end, said first and second terminal end portions in side-by-side relation and having a pivot fastener secured therethrough securing said end portions together for relative rotation about an axis extending transversely and through the remote side faces thereof and spaced generally equally from said twisted portions of said straps but at least slightly closer to the twisted portion of said hitch strap, the free end of said hitch strap including means adapted for pivotal securement to a vehicle which is to be towed, said hitch strap, when in the rearmost extended position, having the upper surface thereof rearwardly of its twisted portion disposed immediately beneath said lower edge of said bumper, said end portions of said strap, as seen therefrom and with said hitch strap disposed rearwardly of said mounting strap, being twisted in opposite directions so that when said hitch strap has its free end pivoted back under said mounting strap and is in an inverted position, said end portions will then be twisted in the same direction and the twisted portion of one end portion will nestle snugly within the curves of the other twisted portion.

6. The combination of claim 5 wherein said upstanding portions are provided with registrable transverse bores, a pivot fastener secured through said bores comprising said pivotal securing means, and wherein said mounting strap includes a pair of brace plates secured between corresponding edge portions of said intermediate portion and said rear portion forwardly of the twisted portion of said mounting strap defining a rearwardly and downwardly opening pocket in which said ball hitch element is receivable when retracted.

7. The combination of claim 6 wherein said last mentioned means includes a ball hitch element which projects upwardly of the free end portion of said hitch strap when said free end of said hitch strap is substantially horizontally disposed and positioned to the rear of said mounting strap.

References Cited in the file of this patent
UNITED STATES PATENTS

| | | |
|---|---|---|
| 2,564,828 | Alexander | Aug. 21, 1951 |
| 2,604,331 | Kingston | July 22, 1952 |
| 2,849,243 | Halverson | Aug. 26, 1958 |